June 11, 1929.  R. H. BROWN  1,716,916
CHILD'S VEHICLE
Original Filed Jan. 26, 1925   3 Sheets-Sheet 1
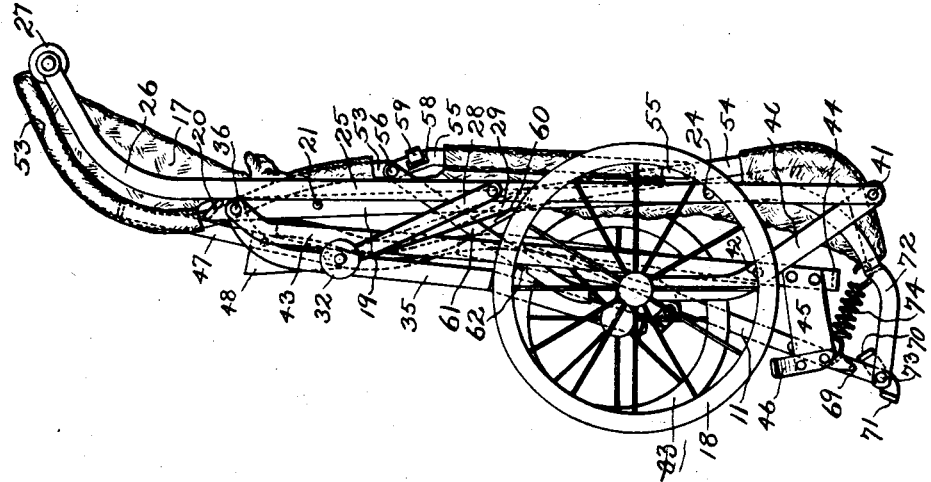

June 11, 1929. R. H. BROWN 1,716,916
CHILD'S VEHICLE
Original Filed Jan. 26, 1925   3 Sheets-Sheet 2

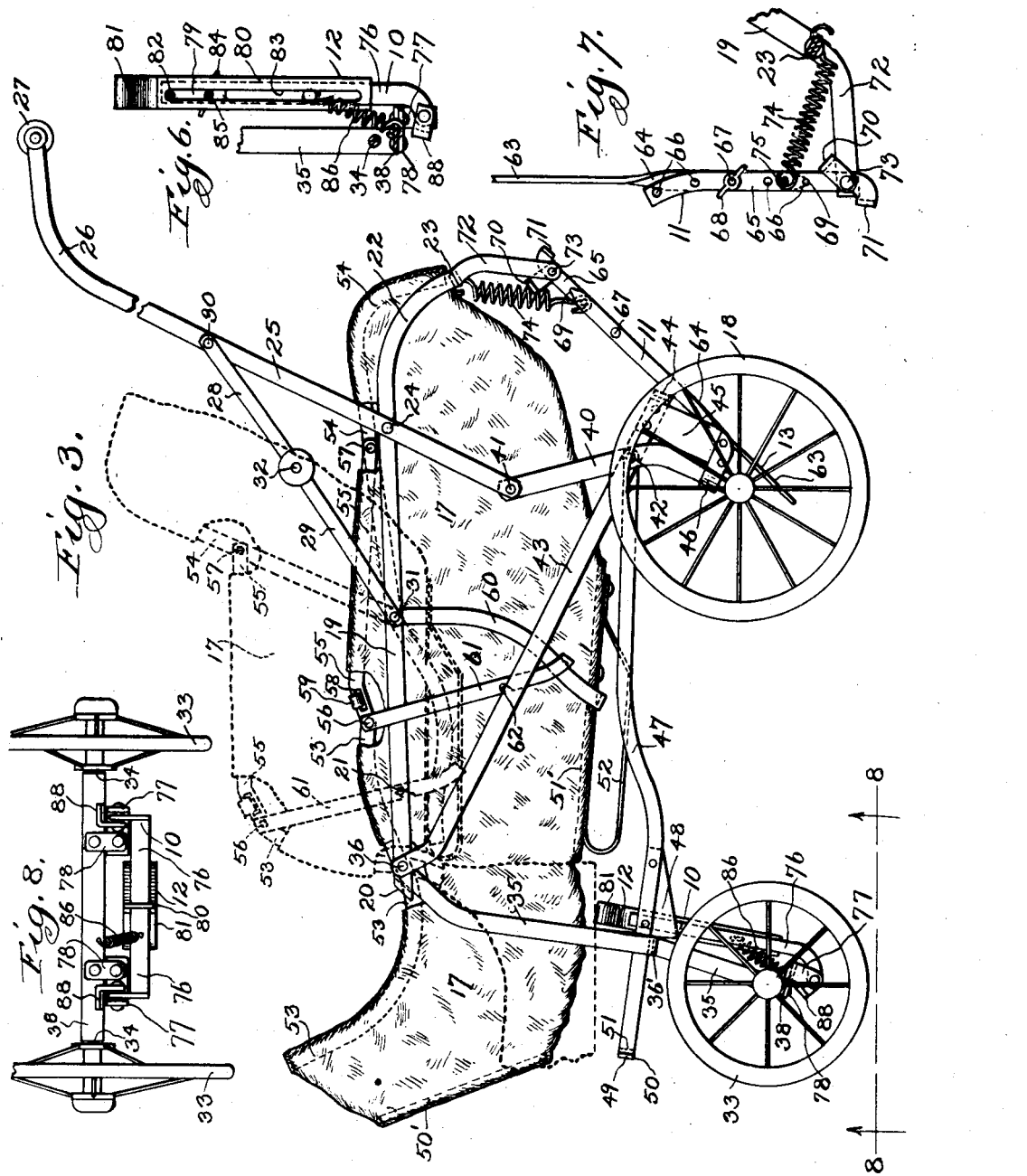

Patented June 11, 1929.

1,716,916

UNITED STATES PATENT OFFICE.

REINHARDT H. BROWN, OF LA PORTE, INDIANA.

CHILD'S VEHICLE.

Application filed January 26, 1925, Serial No. 4,923. Renewed November 5, 1928.

My invention is concerned with collapsible vehicles for children, and is designed to produce such a vehicle that is capable of a plurality of uses in a plurality of positions.

It is designed, first, to produce such a vehicle that can be used as an ordinary baby carriage, and which can be completely collapsed when it is desired to get on a street-car, for instance. It is also designed to produce such a carriage in which the child can lie horizontally, as is desirable for very young babies, or in which it can sit up, as is desirable when they get older.

It is further designed to produce such a collapsible vehicle that can be collapsed, and put in an automobile, and then opened up in such a manner that it can be secured in an automobile so that it can be again occupied by the child, and preferably so that the child can lie down or sit up in it, just as if it were in normal use as a baby carriage.

To illustrate my invention, I annex hereto three sheets of drawings, in which the same reference characters are used to designate identical parts in all the figures, in which,—

Fig. 1 is a view of the vehicle as collapsed and standing on the ground ready for transportation, with the under side exposed;

Fig. 2 is a side elevation of the same as seen from the right-hand side of Fig. 1;

Fig. 3 is a side elevation of the vehicle in ordinary use, with the body shown as extended horizontally in full lines, and as adjusted for sitting up, in dotted lines;

Figs. 6 and 7 are enlarged details in section on the lines 6—6 and 7—7 of Fig. 1; and Fig. 8 is a detail on an enlarged scale as seen looking upward from the line 8—8 of Fig. 3.

Figure 4:
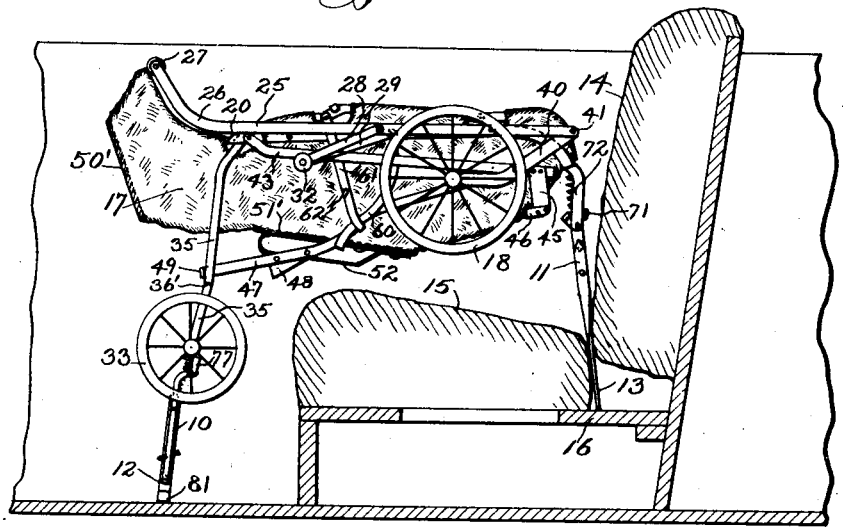
Fig. 4 is a side elevation on a reduced scale, showing the same as held in place in an automobile with the body portion in its horizontal position.
Figure 5:
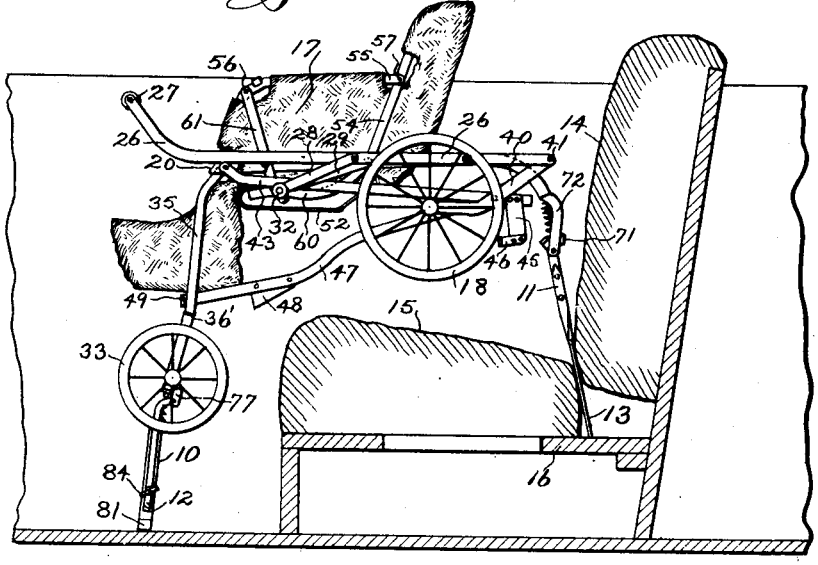
Fig. 5 is a similar view, with the body portion adjusted so that the child can sit up.

My invention is designed primarily to produce a collapsible child's carriage that can be used as an ordinary carriage, the same being shown in its collapsed position in Figs. 1 and 2, and in its extended positions in Fig. 3, for which use the supporting frames might be omitted. It, however, is preferably provided with a front supporting frame 10 and a rear supporting frame 11, which are shown as collapsed in Fig. 3, so as to be out of the way, and which are shown as extended in Figs. 4 and 5, the frame 10 being provided with an adjustable foot 12 which rests on the bottom of the automobile, while the rear frame 11 is provided with the seat-engaging portion 13, to be more fully described hereinafter, which is adapted to be thrust down between the back cushion 14 and the seat cushion 15 of an automobile to engage with the seat frame 16 and be supported thereby, any substantial movement being prevented by reason of its engagement with the cushions 14 and 15. When thus used in an automobile, it may have the body portion 17 arranged horizontally, as shown in Fig. 4, or adjusted to form a seat, back rest and foot well, as shown in Fig. 5. To utilize my invention in this manner, it is necessary to have the rear wheels 18 mounted so that they can be swung up and not engage the cushion 15. To enable my novel vehicle to be used in the manner described, I have devised certain novel framework and connections, which will now be fully described.

What I call the main frame 19 is U-shaped in its general outline, and is preferably made of bar iron, having the stops 20 turned over at the ends for the purpose described, said stops extending at an angle to the general direction of the frame. Not far from these stops are the pins 21 projecting from the sides thereof, which come into play when the apparatus is adjusted as shown in dotted lines in Fig. 3 and in full lines in Fig. 5. Toward the bottom of the frame (considered as a U) it is provided with the downwardly-extending curved portions 22, which are connected by the cross piece 23.

Pivoted to this main frame at 24 is the handle-bar frame 25, which preferably consists of two strips of flat metal, preferably having the upper portions curved as at 26, and the bottom of the U formed by the handle bar 27. This frame 25 can be swung down to the collapsed position shown in Figs. 1, 2, 4 and 5, or thrown up to the extended position shown in Fig. 3, in which extended position it is held by the locking links 28 and 29 pivoted at their outer ends at 30 and 31 to the handle-bar frame and the main frame 19, respectively, their inner ends being pivotally connected by the customary locking joints 32, which cause them to be held rigid against downward pressure when they are in the position shown in Fig. 3, but which can be collapsed upwardly so that they can be swung to the position shown in the other figures.

The front wheels 33 are secured to or journaled on an axle 34, which is preferably mounted to rotate in bearings formed in the lower end of the front-wheel frame 35, which is of a general U-shape in its outline, and, like the other frame members, made of flat strap iron. Its ends are fulcrumed to the end of the main frame at 36, and are inclined, as shown in Fig. 3, so that when the front-wheel frame is extended, as shown in Fig. 3, it will engage and be held from collapsing forwardly by the stops 20 formed on the ends of the main frame 19. The upper portions of the frame 35 converge, as best seen in Fig. 1, to a point 36', where they are bent at substantially right angles to form offsets to which are riveted the ends of the flat cross bar 37 employed to strengthen the frame. So much of the front-wheel frame as thus far described has the outline of a central vertical section of a truncated cone. Beyond the cross bar 37 and including the same, the rest of the frame is rectangular in its outline, and the axle 34 is journaled therein in the lower portions of the sides adjacent to the transverse bottom portion 38. This front-wheel frame can, when it is unlocked, be swung rearwardly and upwardly to the collapsed position shown in Figs. 1 and 2, but when it is used in an automobile, as shown in Figs. 4 and 5, it occupies substantially its normal extended position.

In order that the body portion 17 may be thrown down into the horizontal position shown in Fig. 4, I have supported the rear wheels 18 in a novel manner, which will now be described. The actual supporting members for the horizontal stub axles, a portion 39 of which only is seen in Fig. 1, are the levers 40, which have said stub axles projecting outwardly and horizontally from their lower ends, while their upper ends are pivoted at 41 to the ends of the handle frame 25. These levers 40 are fulcrumed at 42 to the outer face of the sides of the generally U-shaped rear-wheel brace frame 43, the ends of which are fulcrumed to the end of the main frame at 36. Beyond the fulcrum point 42, and adjacent the transverse portion 44 of this brace frame are secured the downwardly-extending plates 45 riveted or otherwise secured thereto, and having riveted to their lower ends the diverging pieces 46, which, as best seen in Fig. 1, form forks or clips which engage the lower ends of the levers 40 and prevent any lateral motion of said levers, and serve to brace the rear-wheel frame mechanism, all of which is locked in its extended position by the links 28 and 29, as shown in Fig. 3, and all of which can be collapsed, as shown in Figs. 1 and 2.

Fulcrumed to both the rear-wheel supporting levers 40, and the rear-wheel brace frame 43 at 42, is another U-shaped frame 47, which I may call the front-wheel thrust and limit frame. When the vehicle frame is extended, as shown in Fig. 3, the triangular projections 48, which are riveted on the insides of the side pieces of the frame 47, as seen in Fig. 1, have their shortest sides extending against the offset portions 36' and the cross bar 37 of the front-wheel frame to prevent the same collapsing rearwardly, its forward movement at that time being prevented by the engagement of its upper ends with the stops 20 previously referred to as employed for that purpose. The U-shaped frame 47 is provided at its bottom with the projections 49, which, as seen in Fig. 1, may be conveniently formed by employing for the cross portion of the frame 47 a separate strip 50 longer than the width of the frame at that point, and which strip is riveted to the turned-over ends 51 of the side pieces of the frame. When the vehicle is used in an automobile, the collapsing of the rear-wheel supporting mechanism draws this frame 47 to the rear until these projections 49 engage the sides of the frame 35 and prevent the front-wheel supporting frame from collapsing forwardly.

The body portion 17 is preferably formed of some flexible material, such as canvas or leather, and is what I may call hammock-shaped in its general outline, which is shaped to conform to the supporting mechanism therefor. To form a flat bottom for the foot well, I enclose in the forward portion thereof a rectangular board or plate 50', indicated in dotted lines in Fig. 3, an extra layer of the canvas or flexible material being preferably provided to cover the same, and to form a seat portion, I similarly enclose another and larger rectangular board or plate, indicated in dotted lines at 51', which will be covered on all sides and faces by the flexible material. To hold some of the controlling mechanism for the body in position, I preferably provide on the under side thereof, and bolted or riveted to the plate 51', the metallic loop 52 formed of strap metal and of the shape best shown in Fig. 3.

The body 17, thus far described, and which is adapted to assume either of the positions shown in Figs. 4 and 5, is supported from the main frame 19 heretofore described by the following connections.

The front portion is supported by the generally U-shaped front body portion 53, which is also preferably composed of strap metal, and has its sides curved, as outlined in Fig. 3, it being fulcrumed to the main frame 19 at 36, preferably by the same rivet as connects the frames 19, 35 and 43 thereto. The bulk of this frame 53 is embedded in the fabric of the body 17, only its ends and the portion adjacent the rivet 36 being exposed. The rear portion of the body is somewhat similarly mounted on the generally U-shaped rear body frame 54, the sides of which are preferably curved downward, as shown in Fig. 3, to produce the concave back portion when the parts are adjusted as shown in Fig. 5. Only the central and cross portion of the frame 54 is embedded in the fabric 17, and the ends of said frame are pivoted to the main frame 19 at the point 31. Connecting the two frames 53 and 54 are the bars 55, pivoted at their ends at 56 to the adjacent ends of the frame 53, and at 57 to the central portion of the sides of the frame 54. The greater portion of these bars 55 is covered by the fabric 17, and when the body is thrown into the seat position of Fig. 5, these bars and the covering form arm rests. In the forward end of the bars 55, I may provide the customary apertures 58 for the customary cross straps 59.

To support the central portion of the body in its hammock shape, and to hold said body in its seat shape, as shown in Fig. 5, I employ the generally U-shaped seat-supporting body frame 60, which is pivoted at its ends to the main frame at 31, preferably by the same rivet as connects thereto the locking bars 29. The transverse portion of this frame 60 passes through the loop 52, and when the parts are in the position shown in full lines in Fig. 3 and in Fig. 5, assists in supporting the body in said position. When the parts are raised to the seat position shown in Fig. 5, the frame 60 swings upwardly about the pivot 31 until its transverse portion engages the forward end of the loop, and this movement raises the seat-board 51 to the horizontal position and forms the foot well beneath it. When this position is reached, the frame 60 is locked in this position by reason of the supporting and locking links 61 being locked in this elevated position by the recess 62 in the outer side of one of its links engaging the pin 21. These links 61 are of an extremely elongated U-shape, so that each one embraces one of the sides of the frame 60, and the bottom portion of each of the links engages said side of the frame 60 and supports the same. The upper ends of the links 61 are pivoted to the ends of the frame 53 and to the adjacent ends of the side pieces 55, preferably by the rivet 56 common to all three parts. When the rear frame 54 is lifted up to bring the body from the position shown in Fig. 4 to that shown in Fig. 5, the action of the links 55, which now act as thrust bars, is to swing the front body supporting frame 53 about the pivots 36 and swing the forward portion of the body downward to form the foot well, and when this position is reached, the recess 62 engages the pin 21 and locks the parts in this particular position.

The mechanism thus far described, with the exception of the frames 10 and 11, might be used as a collapsible baby carriage, and assuming that the parts are extended as shown in Fig. 3, all that is necessary to collapse the same is to break the joints 32, and then swing the handle 27 down toward the front, thus completely collapsing the rear wheels, after which the frame 47 is lifted by its free end to disengage the stops 48 from the cross piece of the front-wheel frame 35, which can then be swung rearward to the full collapsed position shown in Figs. 1 and 2, where it will be held by the frame 11, if said frame be employed, as will be hereinafter explained.

Where the apparatus is to be used with an automobile, as primarily intended, the frames 10 and 11 will be employed in the manner recited at the beginning of the specification, and their preferred specific constructions may be described as follows:

The rear supporting frame 11 is preferably adjustable for length, and with this end in view, I form the bottom portion 63 of a piece of strap metal of the general U-shape shown in Fig. 1, and about the middle portion thereof at 64, the sides are twisted at right angles to bring them parallel to and in contact with the portions 65 of the frame 11, which contain a plurality of apertures 66 therein, so that the length of the frame can be adjusted by passing the bolts 67 through the desired apertures and securing the parts together by the thumb nuts 68. The upper ends of the adjustable portion of the frame 11 are provided with the inwardly-projecting lugs 69, which fit in certain of the apertures 66, depending upon the adjustment. The bars 65 are provided at their upper ends with a pair of stop lugs 70 and 71 projecting outwardly, and adapted to co-operate with the downwardly-turned sides 72 of the U-shaped frame having its cross portion riveted to the cross portion 23 of the main frame 19, said downwardly-projecting sides forming ears to which the pieces 65 are pivoted at 73. The lugs 71 formed integral with the pieces 65 engage the side pieces 72 when the frame is in use, as seen in Figs. 4 and 5. The lug 70 is preferably, for convenience of manufacture, formed separately from the parts 65, being L-shaped in its general outline and secured on the rivet or bolt 73, where, when the frame is collapsed, as seen in Figs. 1 and 2, the outwardly-projecting flange or stop portion proper 70 is cut between the inner side of the car 72 and the adjacent edge of the associated part 65. The frame 11 is held yieldingly in either position by reason of the helically-coiled contractile spring 74, which has its upper end connected to the transverse portions of the frames 72 and 19, and its lower end hooked around a cross rod 75 connecting the parts 65.

The front frame or foot 10, as best seen in Figs. 1, 6 and 8, has its sides 76 converging, as shown, said sides being pivoted at their upper ends to ears 77 extending downwardly, when the parts are in the position shown in Fig. 3, from the lugs 78, which are secured to the cross piece 38 of the front-wheel frame 35. The length of the frame is made adjustable by securing between the parallel ends 79 of the parts 76 the slotted bar 80, which terminates in the foot 81 which is adapted to rest on the floor of the car, as seen in Figs. 4 and 5. The parallel ends 79 are connected at their outer ends by the pin or rivet 82 which passes through the slot 83 in the bar 80, and the parts are held in the desired adjustment by tightening the thumb nut 84 on the screw bolt 85 passed through apertures in the parallel portions 79 and through the slot 83. The front supporting frame is held yieldingly in either its operative or its inoperative position by the helically-coiled contractile spring 86, which has one end suitably secured to one of the pieces 76, while its other end is hooked into an aperture in the cross piece 38. In the collapsed position shown in Figs. 3 and 6, the adjacent ends of the pieces 76 contact with the ears 77 to limit their movement, while when they are in the extended position shown in Figs. 4 and 5, the opposite edges contact with the angular ears 88, similar to the ears 70, and are stopped by reason of their engagement therewith and the engagement of the sides of the ears 88 with the sides of the ears 77. These lugs or ears 88 are secured on the same rivet pin as the ears 77 and the adjacent ends of the parts 76.

In connection with the action of both of the springs 74 and 86, it will be noted that in passing from one position to the other, the springs are carried past the center, so that they operate to hold the supporting frames in either position.

The operation of the complete device will be readily apparent: Assuming that the parts are in the position as shown in Fig. 5, and it is desired to remove the same, the link 61 is swung backward until the recess 62 is disengaged from the pin 21, when the flexible body portion can be swung down to the position shown in Fig. 4. The front supporting frame 10 is now swung upward, after which the frame 47 is lifted sufficiently so that the frame 35 can be swung up to its collapsed position, after which the rear supporting frame 11, which has been lifted from between the cushions 14 and 15, is swung toward the collapsed position, where, as shown in Fig. 1 the spring 74 acting through it tends to hold the parts in their collapsed position.

If the vehicle is to be collapsed from the position shown in full lines in Fig. 3, it is preferable to first throw the rear supporting frame 11 to the position shown in Figs. 4 and 5, after which the collapsing will be performed as heretofore described. It is possible to collapse the rear supporting frame 11 beneath the front-wheel supporting frame, as shown in Fig. 2, but I prefer to collapse it outside, as shown in Fig. 1, in order that the spring 74 may function to hold the parts in their collapsed position. When they are collapsed as shown in either Fig. 1 or 2, the handle bar 27 with the adjacent portion of the flexible covering 17 and the supporting frame 53 are conveniently gripped and the collapsed vehicle can be readily carried by one hand, or deposited on the ground in the position shown in Figs. 1 and 2. When it is desired to open it up, all that is necessary is to take it by the handle 27 and, as it were, throw the rest of it away from the handle, when the parts will open up by gravity to substantially their final position to which they will be removed when the locking links 28 and 29 are straightened out as shown in Fig. 3.

While I have herein shown and described a flexible body that can assume a trough-like shape to accommodate a child lying down at full length, or that of a seat for a child with a back rest and a foot well, or that can be collapsed for ready transportation by hand, and which is adapted to be supported when extended in an automobile, I do not herein claim the same generically, but only specifically, as the generic claims to such a structure are reserved for my prior application No. 754,256, filed December 6, 1924.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as my invention, and desire to secure by Letters Patent of the United States, is:

1. In a child's vehicle, the combination with a main frame, of a body portion supported thereby, a front-wheel supporting frame extending downward from the main frame, a supporting foot secured to and extending below the front-wheel supporting frame, a supporting element extending downwardly from the rear of the main frame, and a collapsible framework supporting rear wheels, said supporting element adapted to be in operative position when the rear wheel framework is collapsed.

2. In a child's vehicle, the combination with a main frame, of a body portion supported thereby, a front wheel supporting frame extending downward from the main frame, a supporting foot secured to and extending below the front-wheel supporting frame, a supporting element extending downwardly from the rear of the main frame, and a collapsible framework supporting rear wheels, said collapsible framework embodying a rear-wheel controlling frame pivoted on the main frame and capable of being locked in operative position thereon, stub axle-supporting levers pivoted to the rear-wheel controlling frame, and a wheel brace frame upon which the axle-supporting levers are fulcrumed pivoted on the main frame and adapted to engage the axle-supporting levers to hold them from movement.

3. In a child's vehicle, the combination with a main frame, of a body portion supported thereby, a collapsible front-wheel supporting frame extending downward from the main frame, a collapsible supporting foot secured to and extending below the front-wheel supporting frame, a collapsible supporting element extending downwardly from the rear of the main frame, and a collapsible framework supporting rear wheels, said collapsible framework embodying a rear-wheel controlling frame which also supports a handle bar and which is pivoted on the main frame and capable of being locked in operative position thereon, stub axle-supporting levers pivoted to the rear-wheel controlling frame, and a wheel brace frame upon which the axle-supporting levers are fulcrumed pivoted on the main frame and adapted to engage the axle-supporting levers to hold them from movement.

4. In a child's vehicle, the combination with a main frame, of a body portion supported thereby, a collapsible front-wheel supporting frame extending downward from the main frame, a supporting foot secured to and extending below the front-wheel supporting frame, a supporting element extending downwardly from the rear of the main frame, a collapsible framework supporting rear wheels, and a spring interposed between the main frame and the supporting element and tending to hold the latter in operative position or upon the collapsed front-wheel supporting frame.

5. In a child's vehicle, the combination with a main frame, of a body portion supported thereby, a front wheel supporting frame extending downward from the main frame, a supporting foot secured to and extending below the front-wheel supporting frame, a supporting element extending downwardly from the rear of the main frame, and a collapsible framework supporting rear wheels, said collapsible framework embodying a rear-wheel controlling frame which also supports a handle bar pivoted on the main frame and capable of being locked in operative position thereon, stub axle-supporting levers pivoted to the rear-wheel controlling frame, and a wheel brace frame upon which the axle-supporting levers are fulcrumed pivoted on the main frame and adapted to engage the axle-supporting levers to hold them from movement.

6. In a child's vehicle, the combination with a main frame, of a handle frame fulcrumed thereon, axle-supporting levers pivoted to the handle frame below the main frame, a wheel brace frame upon which the axle-supporting levers are fulcrumed pivoted on the main frame and adapted to engage the axle-supporting levers to hold them from movement, a supporting element pivoted to the rear of the main frame, and a spring connecting the main frame and the supporting element and tending to hold the latter in operative position for engaging the wheel brace frame so as to tend to collapse the latter and its associated elements.

7. In a child's vehicle, the combination with a main frame, of a handle frame fulcrumed thereon, axle-supporting levers pivoted to the handle frame below the main frame, a wheel brace frame upon which the axle-supporting levers are fulcrumed pivoted on the main frame and adapted to engage the axle-supporting levers to hold them from movement, a front-wheel supporting frame pivoted to the main frame, and a thrust and limit member for the front-wheel supporting frame pivoted to the wheel brace frame and the axle-supporting levers.

8. In a child's vehicle, the combination with a main frame, of a front-wheel supporting frame pivoted thereon and collapsible rearwardly and upwardly toward the main frame, a pair of rear wheels, a compound framework for supporting said rear wheels separately collapsible forwardly and upwardly toward the main frame, and a rear collapsible supporting frame pivoted on the main frame and serving when collapsed to hold the collapsed front-wheel supporting frame upon the collapsed compound frame.

9. In a child's vehicle, the combination with a main frame, of a front-wheel supporting frame pivoted thereon and collapsible rearwardly and upwardly toward the main frame, a pair of rear wheels, a compound framework for supporting said rear wheels separately collapsible forwardly and upwardly toward the main frame, a rear supporting frame pivoted on the main frame, and a spring between the main frame and the rear supporting frame and tending to hold the latter in its operative position or when collapsed to hold the collapsed front-wheel supporting frame upon the collapsed compound frame.

10. In a child's vehicle, the combination with a main frame, of a front-wheel supporting frame pivoted thereon and collapsible rearwardly and upwardly toward the main frame, a front supporting frame fulcrumed on the lower portion of the front-wheel supporting frame, a pair of rear wheels, a compound framework for supporting said rear wheels movable upon the main frame and separately collapsible forwardly and upwardly toward said main frame, and a rear supporting frame fulcrumed on the main frame and collapsible toward the same.

11. In a child's vehicle, the combination with a main frame, of wheel-supporting framework associated therewith, a front body frame pivoted to the main frame, a rear body frame pivoted to the main frame, a flexible body secured at its ends to said body frames and having a rigid seat portion in the center of the bottom thereof, and connections between said body frames whereby the body can be held as a horizontal hammock or as a seat with a back and foot well, said connections comprising a bail-like frame pivoted at its ends to the main frame and having its transverse portion directly beneath the seat portion, and an elongated loop secured on the under side of the seat portion and through which said transverse portion extends and moves as the body is shifted.

12. In a child's vehicle, the combination with a main frame, of wheel-supporting framework associated therewith, a front body frame pivoted to the main frame, a rear body frame pivoted to the main frame, a flexible body secured at its ends to said body frames and having a rigid seat portion in the center of the bottom thereof, and connections between said body frames whereby the body can be held as a horizontal hammock or as a seat with a back and foot well, said connections comprising a bail-like frame pivoted at its ends to the main frame and having its transverse portion directly beneath the seat portion, and supporting links depending from the front body frame and embracing the sides of the bail-like frame.

13. In a child's vehicle, the combination with a main frame, of wheel-supporting framework associated therewith, a front body frame pivoted to the main frame, a rear body frame pivoted to the main frame, a flexible body secured at its ends to said body frames and having a rigid seat portion in the center of the bottom thereof, and connections between said body frames whereby the body can be held as a horizontal hammock or as a seat with a back and foot well, said connections comprising a bail-like frame pivoted at its ends to the main frame and having its transverse portion directly beneath the seat portion, supporting links depending from the front body frame and embracing the sides of the bail-like frame, and a locking pin carried by the main frame with which a locking recess in one of the supporting links cooperates.

14. In a child's vehicle, the combination with a main frame, of wheel-supporting framework associated therewith, a front body frame pivoted to the main frame, a rear body frame pivoted to the main frame, a flexible body secured at its ends to said body frames, and connections between said body frames whereby the body can be held as a horizontal hammock or as a seat with a back and foot well, said connections comprising a pair of horizontal links which function as arm rests when the body is erected, a bail-like link frame pivoted at its ends to the main frame and having its transverse portion directly beneath the seat portion, and vertical supporting links depending from the junction of the horizontal links and the front body frame and embracing the sides of the bail-like frame.

15. In a child's vehicle, the combination with a main frame, of a front-wheel supporting frame depending therefrom, a front supporting member pivoted to the lower portion of the front-wheel supporting frame and capable of being extended below or folded up upon the front-wheel supporting frame, a rear-wheel supporting framework pivoted upon the main frame and capable of being collapsed toward it, and a rear supporting member mounted so as to be held rigidly relative to the main frame in its operative position or collapsed toward the rear-wheel supporting framework.

16. In a child's vehicle, the combination with a main frame, of a front-wheel supporting frame depending therefrom, a front supporting member pivoted to the lower portion of the front-wheel supporting frame and capable of being extended below or folded up upon the front-wheel supporting frame, a rear-wheel supporting framework pivoted upon the main frame and capable of being collapsed toward it, a rear supporting member mounted so as to be held rigidly relative to the main frame in its operative position or collapsed toward the rear-wheel supporting framework, and springs adapted to hold said supporting members yieldingly in either this operative or inoperative position.

17. In a child's collapsible vehicle, the combination with a main frame, of a handle frame fulcrumed thereon, stub-axle-supporting levers pivoted to the handle frame below the main frame, and a wheel-brace frame upon which the axle-supporting levers are fulcrumed pivoted on the main frame and adapted when the vehicle is extended to engage the axle-supporting levers at a distance from their fulcrums to hold them from sidewise movement but not so engaging them when it is collapsed.

18. In a child's collapsible vehicle, the combination with a main frame, of a handle frame fulcrumed thereon, stub-axle-supporting levers pivoted to the handle frame below the main frame, a wheel-brace frame upon which the axle-supporting levers are fulcrumed pivoted on the main frame and adapted when the vehicle is extended to engage the axle-supporting levers at a distance from their fulcrums to hold them from sidewise movement but not so engaging them when it is collapsed, and locking links between the main frame and the handle frame to hold the elements in their extended position.

In witness whereof, I have hereunto set my hand this 14th day of January, 1925.

REINHARDT H. BROWN.